M. H. COLLOM.
VALVE MECHANISM FOR STEAM HEATED ROTARY CYLINDERS.
APPLICATION FILED MAR. 31, 1916.

1,227,040.

Patented May 22, 1917.
2 SHEETS—SHEET 1.

Witnesses
Otto E. Hoddick.
John B. Dade.

Inventor
Martin H. Collom.
By A. J. Rosin
Attorney

UNITED STATES PATENT OFFICE.

MARTIN H. COLLOM, OF DENVER, COLORADO.

VALVE MECHANISM FOR STEAM-HEATED ROTARY CYLINDERS.

1,227,040. Specification of Letters Patent. Patented May 22, 1917.

Application filed March 31, 1916. Serial No. 88,018.

*To all whom it may concern:*

Be it known that I, MARTIN H. COLLOM, a citizen of the United States, residing in the city and county of Denver and State of Colorado, have invented certain new and useful Improvements in Valve Mechanism for Steam-Heated Rotary Cylinders; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in valve controlling mechanism, my special object being to prevent the sudden opening of a valve whereby fluid as steam is allowed to enter a cold receptacle as the drum of a mangle, since the sudden entrance of steam in a relatively large volume into such a receptacle is attended with disastrous results, since the sudden heating of the drum cracks or ruptures the same, due to too unequal expansion. While this is the particular object which I have in mind and the special use of my improvement which will be uppermost in mind in describing the structure, it must be understood that the invention is not limited to this particular use, but may be advantageously employed in other relations where a similar or like function is required.

My invention is well adapted for use with a globe valve of ordinary construction and with other valves which operate on a similar principle, that is to say, which are normally manually operated by means of a screw stem whereby as the stem is rotated through the medium of an exposed hand wheel, the valve is advanced toward its seat or retracted, according to the direction of the rotation of the stem.

My improvement consists in applying to the stem of a valve of this character features which are adapted to coöperate with other mechanism also forming a part of my improvement, in such a manner as to positively lock the valve against manual operation for initial opening purposes, thus absolutely preventing the sudden introduction of fluid as steam into the drum of the mangle for instance, it being assumed that the valve is so arranged as to regulate the control of the passage of steam from the boiler to the said drum. Furthermore, my improvement is of such character that the valve may be manually operated for closing purposes in substantially the same manner as if my improvement were not employed.

Having briefly outlined the invention, as well as the function it is intended to accomplish, I will proceed to describe the same in detail, reference being made to the accompanying drawing, in which is illustrated an embodiment thereof. In this drawing,—

The same reference characters indicate the same parts in all the views.

Figure 1:
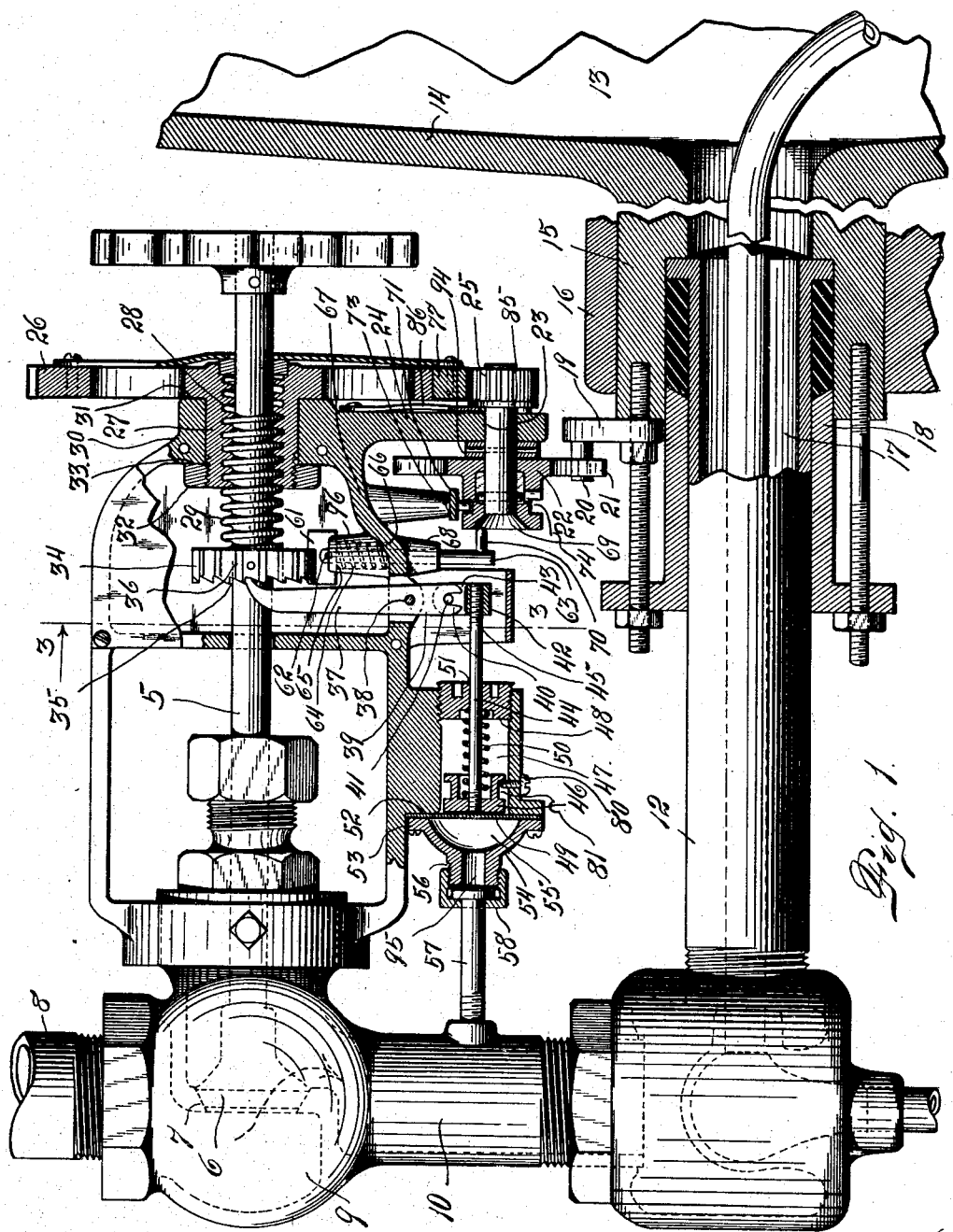
Figure 1 is a view partly in elevation and partly in section illustrating my improved valve controlling mechanism, the same being shown applied to a valve arranged to regulate the passage of fluid to a drum or receptacle, the latter being largely broken away.

Let the numeral 5 designate the stem and 6 the valve piece of an ordinary globe valve, the valve piece being adapted to engage a seat 7 for regulating the passage of steam from a supply pipe 8 through a casing 9 which is provided with a port to allow the steam when the valve is unseated to pass through the casing 9 to a conduit member 10, and thence through a member 12 into the chamber 13 of a drum 14 which it will be assumed is the drum of a mangle mounted to rotate on end trunnions 15 (one only being shown) in bearings 16, one of the trunnions being hollow as shown at 17 to allow the steam to enter from the conduit 12, and equipped with a stuffing box construction 18 whereby a fluid tight joint is formed between the trunnion and the conduit 12. The hollow trunnion 15 is equipped with a crank arm 19 provided with a pin 20 adapted to engage the teeth 21 of a star wheel 22 splined on a spindle 23 which is journaled in a stationary part 24 of the structure in which the valve is mounted. The spindle 23 is equipped with a fast pinion 25 which meshes with a gear wheel 26 whose hub 27 constitutes a nut interiorly threaded as shown at 28 to coöperate with the threaded part 29 of the valve stem 5. This hub or nut 27 is journaled in a stationary bearing 30 to prevent longitudinal travel of the nut on the screw stem of the valve, the gear 26 being provided with a shoulder 31 which engages the bearing 30 on one side, while a stop nut 32 threaded on the member 27 engages an opposite shoulder 33 of the bearing.

The star wheel 22 is adjustable on the spindle 23 and longitudinally thereof, whereby its teeth 21 may be thrown into or out of the path of travel of the pin 20 of the crank arm 19 as the mangle drum is rotated. Provision is made, as hereinafter described, for locking the valve stem 5 against operation for valve opening purposes, except through the medium of the star wheel when actuated by the crank arm 19 as the drum is rotated, the opening movement of the valve stem in this case being slowly accomplished through the medium of the pinion 25 and the gear 26, the hub or nut 27 in this case being rotated to impart the longitudinal travel to the valve stem in the valve opening direction, this movement, however, being so slow that the steam is introduced very gradually into the drum, thus preventing any injurious consequences of the character heretofore indicated.

Figures 2, 3:
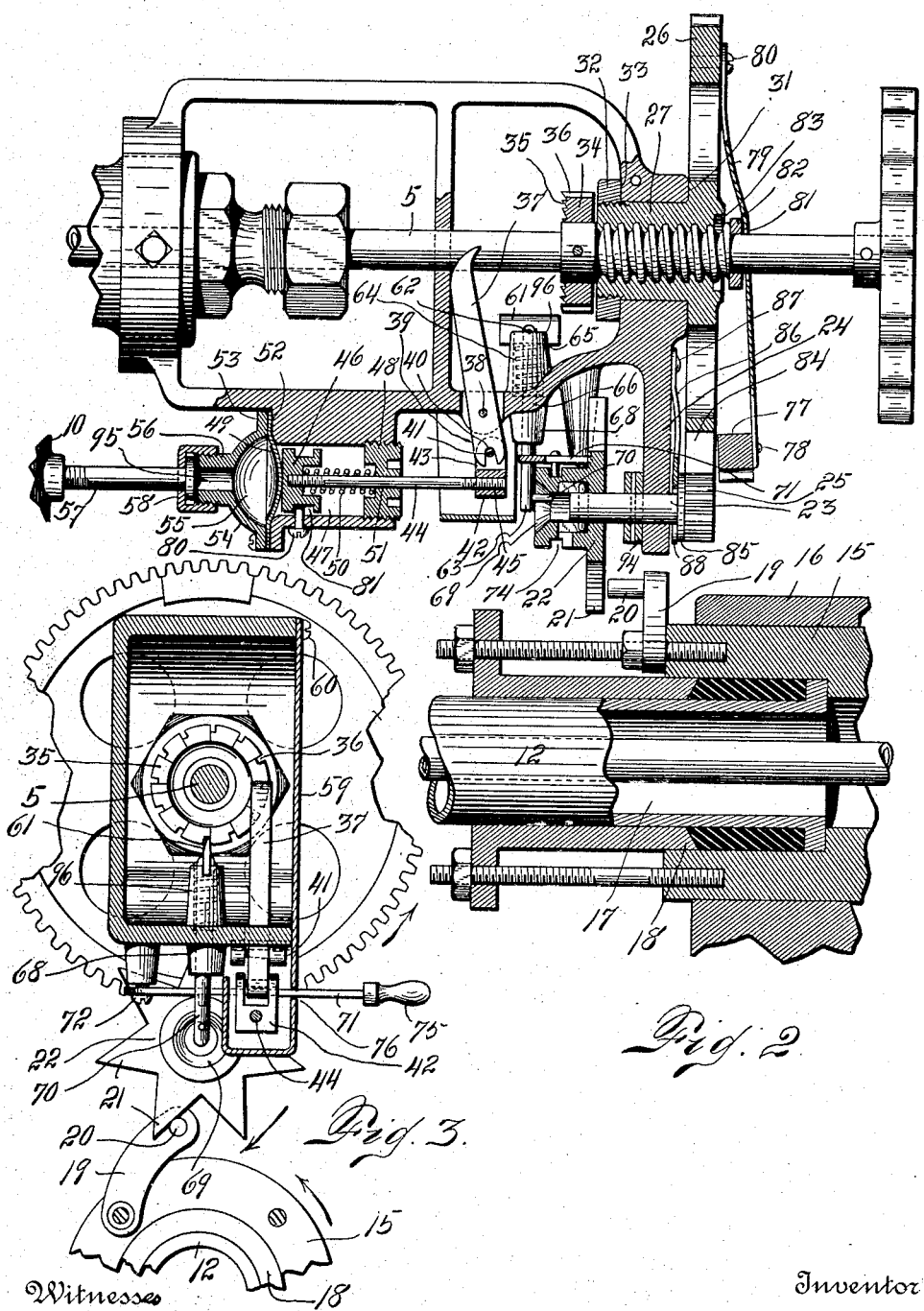
Fig. 2 is a similar view, the parts, however, being shown in different relative positions.
Fig. 3 is a section taken on the line 3—3, Fig. 1, looking toward the right.

Upon the valve stem 5 is mounted a fast wheel 34 which is provided on one face with teeth 35 and on its periphery with recesses 36. The teeth 35 are adapted to be engaged by a pawl 37 fulcrumed on the frame of the structure as shown at 38, its short arm 39 beyond the fulcrum being slotted as shown at 40 to engage a pivot pin 41 mounted on a member 42 which is slotted as shown at 43 to receive the slotted end of the pawl. The member 42 is connected with one end of a stem 44 which has a threaded portion 45 which enters a threaded opening in the said member. This stem 44 is connected at its opposite extremity with a piston or plunger 46 located in a chamber 47 formed in the framework of the structure, one extremity of the said chamber being closed by a screw plug 48 while its opposite extremity is closed by a flexible diaphragm 49 against which the plunger 46 is held by means of a spiral spring 50 which surrounds the stem 44, one extremity bearing against the plunger while its opposite extremity engages the screw plug. The stem 44 passes through a perforation 51 formed in the said plug and in which the stem fits closely. The diaphragm 49 is held between the circumferential shoulder 52 at the base of the chamber 47 and a flange 53 of a coöperating member 54 having a chamber 55 arranged on the opposite side of the diaphragm from the plunger 46. This member 54 is provided with a nipple 56 with which a pipe 57 is connected by means of a coupling sleeve 58. This pipe 57 is in communication at one extremity with the conduit 10 through which the steam passes on its way to the drum 13 as heretofore explained. The pipe 57 communicates by way of an opening 95 in the nipple 56 with the chamber 55. The diaphragm 49 is made of such material that when its outer portion is clamped between the parts 52 and 53, its central portion will expand in response to the pressure of the steam in the pipe 10 which is the same as in the drum 13, whereby the plunger 46 will be actuated (see Fig. 2) to move the stem 44 against the tension of its spring 50, to throw the pawl 37 into the inactive position (see Fig. 2) or so that it cannot engage the teeth 35 of the wheel 34. The function of this construction is to maintain the free extremity of the pawl 37 in engagement with the toothed face of the wheel 34 through the medium of the spring 50 acting on the stem 44 through the plunger 46, when there is no steam in the drum 13, or at least not enough to produce sufficient pressure to expand or flex the diaphragm 49 as shown in Fig. 2. In other words, when the drum 13 is cold and the valve piece 6 is in the closed position, the pawl 37 engages the teeth 35 of the wheel 34, to lock the stem 35 against rotation in a direction to open the valve, and this pawl together with its controlling mechanism, is concealed by means of a housing plate 59 which is secured to the stationary framework of the valve mechanism, by means of fastening screws 60 or in any other suitable manner.

Provision is also made for locking the wheel 34 against movement in the direction to open the valve stem, through the medium of a stop plate 61 which is secured as shown at 62 to the inner extremity of a stem 63 which is acted on by a spiral spring 64 one extremity of which engages a shoulder 65 formed on the stem, while its opposite extremity engages a shoulder 66 formed in the stationary framework of the structure. This spring is inclosed by a stationary casing 96 formed integral with a part 67 of the framework. This part 67 is also provided with a guide lug 68 which is perforated to allow the stem 63 to pass therethrough. The construction is such that the spring 64 normally acts to force the stop plate 61 into one of the recesses 36 of the wheel 34. This stop plate extends in a direction parallel with the valve stem 5, so that as the valve stem moves longitudinally in a direction to open the valve, the wheel 34 will disengage itself from the stop plate, when the valve is completely open. It will also be understood that during the opening movement of the valve, the wheel 34 will disengage itself from the pawl 37 shortly after the opening movement of the valve commences. As soon as the valve 34 is released from the locking action of the pawl 37 and the stop plate 61, whereby the stem 5 is free to rotate, the rotation of the wheel 26 and its nut 37, will no longer serve to move the valve stem 5 in the valve opening direction, since the stem and the nut will rotate in unison without any longitudinal travel of the valve stem.

After the valve has been opened to its limit of movement, the stem 5 must be free to rotate for the closing movement of the valve without interference by the stop plate 61. Hence, provision is made for disengaging this stop plate from the wheel 34, and this is accomplished as the star wheel 22 is shifted on the spindle 23 toward the left or to the position shown in Fig. 2, whereby the teeth of the star wheel will be removed from the path of the pin 20 of the crank arm 19. The hub of the star wheel is provided with a recess 69 having a beveled wall which as the star wheel is shifted toward the left (see Figs. 1 and 2), engages a pin 70 on the stem 63, and imparts sufficient longitudinal travel to the said stem to disengage the stop plate from its recess in the wheel 34, whereby the said stop plate lies beyond the path of the periphery of the said wheel.

This shifting movement of the star wheel, is accomplished through the medium of a lever 71 which is fulcrumed at one extremity on the framework as shown at 72 and provided intermediate its extremities with a lug 73 which enters a circumferential groove 74 formed in the hub of the star wheel. The handle 75 of this lever is exposed whereby it is accessible to the person in charge of the apparatus, so that by shifting the lever in the one direction or the other, the star wheel may be thrown into or out of the path of the pin 20 as may be desired. The housing 59 is slotted as shown at 76 to allow the necessary movement of the lever 71, to perform the aforesaid function.

A segment 77 of the cogged rim of the gear 26, is severed from the gear and secured as shown at 78 to one extremity of a leaf spring 79 which is secured at its opposite extremity as shown at 80 to the rim of the gear, the said spring having an opening 81 through which the valve stem 5 freely passes. A washer 82 normally engages a shoulder 83 formed on the nut or hub 27 of the gear 26. This washer is also in engagement with the spring 79 which is arranged on the opposite side from the shoulder 83. As soon as the stem 5 of the valve has moved outwardly or toward the right (see Figs. 1 and 2), a sufficient distance to open the valve, the threaded portion of the stem which constitutes a shoulder, acts on the washer 82 to force the spring 79 outwardly to the position shown in Fig. 2, whereby the segment 77 of the cogged periphery of the gear 26, will be disengaged from the wheel, forming a space of sufficient magnitude to prevent the operation of the gear through the medium of the pinion 25, as soon as the gear has been turned sufficiently to cause the pinion to enter the recess or space 84 formed by the removal of the segment 77. In this way provision is made for automatically stopping the rotation of the gear 26 through the medium of the star wheel 22, after the function of the latter has been completed. It will also be understood that in the event that the segment 77 of the gear 26 when removed from its recess 84, is some distance from the pinion 25, the wheel 26 may continue to turn until the pinion reaches the recess 84 without injury to the mechanism, since as soon as the segment 77 is removed from its position in the wheel, the toothed wheel 34 is also disengaged from the stop plate 61, whereby the further rotation of the wheel 26 and its hub-nut 27, will result in the rotation of the stem 5 with the nut, and, consequently, there will be no longitudinal travel of the stem 5. From this it will be understood that the operation of the mechanism is automatic to the extent of preventing any injury to the mechanism by virtue of the fact that the opening movement of the valve is accomplished through the medium of the rotary action of the drum 13.

From the foregoing description the use and operation of my improved valve or valve-controlling mechanism will be readily understood. Assuming that the valve is in the closed position, if it is desired to introduce steam into the mangle-drum for operating purposes, the rotary action of the drum is imparted through the medium of any suitable driving mechanism (not shown). At the same time the star wheel 22 is shifted from the position shown in Fig. 2 to the position shown in Fig. 1, whereby its teeth 21 lie in the path of travel of the pin 20 of the crank arm 19 carried by the trunnion 15 of the drum 13. This releases the stop plate 61 which immediately engages a recess 36 of the wheel 34. At the same time the pawl 37 is in locking engagement with the toothed face of the said wheel to prevent rotary movement of the stem 5 in a direction to open the valve. Then, as the drum rotates, during each complete revolution, the pin 20 will act on a tooth of the star wheel 22 to impart a partial rotary movement to the spindle 23 and the pinion 25. It will thus be seen that as the pinion 25 is relatively small as compared with the cogged periphery of the gear 26, a large number of revolutions of the drum 13 will be required in order to open the valve, and that, consequently, the opening movement of the valve is very slowly accomplished so that the steam is admitted into the drum 13 so gradually that all injury to the drum by reason of such introduction is obviated or prevented. Furthermore, the outward travel of the valve stem 5, due to the rotation of the nut 7, will cease automatically by virtue of the mechanism whose operation has been heretofore set forth.

Attention is called to the fact that the pinion 25 is subjected to the action of a spring-actuated friction washer 85 which is mounted on the spindle 23 and engages the inner face of the said pinion, the said washer being actuated by a leaf spring 86 which is secured to the stationary framework as shown at 87. The outer portion of this spring is bifurcated as shown at 88 to straddle the spindle 23 whereby it acts upon the washer 85 to produce sufficient friction between the washer and the pinion, to prevent the latter and its connections from moving in response to the momentum imparted through the medium of the star wheel, by the pin 20. Were it not for this friction device, each stroke of the pin 20 might result in moving the pinion 85 farther than is desirable in order to properly limit the opening movement of the valve as heretofore explained.

The movement of the stem 44 which is connected with the pawl 37 as heretofore described, is limited in both directions by a set screw 80 which enters a groove 81 formed in the plunger 46.

Attention is called to the fact that the term drum or cylinder wherever used in the specification and claims must be considered broad enough to include a hollow rotary receptacle of any kind with which it may be practicable to employ my improved construction. Furthermore, the term steam wherever used in the specification and claims must be considered comprehensive enough to cover fluid of any character.

In further explanation of the means for frictionally retarding the rotation of the pinion 25 and its coöperating gear, it should be explained that the spindle 23 is locked against longitudinal travel in its bearing in the part 24, by a collar 94 which is keyed to the spindle and is in contact with the frame part 24 on the opposite side thereof from the washer 85 and its engaging spring 86. This collar 94 may have a relatively large frictional surface area and acting in coöperation with the spring 86 and the washer 85, will produce the necessary retarding action, whereby it will be difficult to manually rotate the star wheel. It will be evident that it is desirable to make the manual rotation of the star wheel difficult, in order to prevent possible tampering with the mechanism or the possible opening of the valve by the rotation of the nut 27 more rapidly than is desirable. It will be understood that it will be practicable to rotate the star wheel through the instrumentality of the drum as heretofore described, notwithstanding the retarding action of the frictional construction heretofore explained since the power of the rotating drum is so great comparatively speaking that the amount required to operate the star wheel in opposition to the aforesaid retarding influence, is inappreciable.

Having thus described my invention, what I claim is,—

1. In valve mechanism for controlling the passage of fluid to rotary receptacles, the combination of a valve piece having a rotary stem provided with a threaded portion, a nut having threads coöperating with the threads of the said stem, the nut being journaled to prevent travel longitudinally on the stem, means for locking the stem against rotation in one direction, and an operative connection between the rotary receptacle and the nut for rotating the latter in the opposite direction.

2. The combination with a hollow rotary member, of a valve provided with a rotary stem having a threaded portion, a nut threaded to receive the threaded portion of the stem and journaled to prevent travel longitudinally on the stem, means to prevent rotation of the stem in one direction, and an operative connection between the rotary member and the nut to rotate the latter in the opposite direction to move the valve and its stem in the direction of the latter's axis.

3. The combination with a rotary drum, of a valve for controlling the supply of fluid thereto, said valve having a rotary stem, means for locking the stem against rotary movement in a direction to open the valve, a nut in which the valve stem is threaded, the nut being journaled to prevent travel in the direction of the axis of the stem, and an operative connection between the nut and the drum, whereby as the latter is rotated the nut will be actuated to move the valve and its stem in the valve-opening direction.

4. The combination with a hollow rotary drum, of a valve for controlling the supply of steam thereto, the valve having a stem mounted to rotate, and provided with a threaded portion, a nut which the threaded portion of the stem engages, the nut being journaled to prevent travel in the direction of the axis of the stem, means for preventing the stem when the valve is closed from rotating in a direction to turn on the steam, and an operative connection between the nut and the drum to impart a step-by-step rotary movement to the nut as the drum rotates.

5. The combination with a hollow rotary drum, of a valve for controlling the supply of steam thereto, the valve having a stem mounted to rotate, and provided with a threaded portion, a nut which the threaded portion of the stem engages, the nut being journaled to prevent travel in the direction of the axis of the stem, means for preventing the stem when the valve is closed from rotating in a direction to turn on the steam, an operative connection between the nut and the drum to impart a step-by-step rotary movement to the nut as the drum rotates, and means for automatically releasing the means for locking the valve stem against rotation.

6. The combination with a hollow rotary drum, of a valve for controlling the supply of steam thereto, the valve having a stem mounted to rotate, and provided with a threaded portion, a nut which the threaded portion of the stem engages, the nut being journaled to prevent travel in the direction of the axis of the stem, means for preventing the stem when the valve is closed from rotating in a direction to turn on the steam, an operative connection between the nut and the drum to impart a step-by-step rotary movement to the nut as the drum rotates, and means for manually breaking the operative connection between the drum and the nut.

7. The combination with a hollow rotary drum, of a valve for controlling the supply of steam thereto, the valve having a stem mounted to rotate, and provided with a threaded portion, a nut which the threaded portion of the stem engages, the nut being journaled to prevent travel in the direction of the axis of the stem, means for preventing the stem when the valve is closed from rotating in a direction to turn on the steam, an operative connection between the nut and the drum to impart a step-by-step rotary movement to the nut as the drum rotates, means for manually breaking the operative connection between the drum and the nut, and means for automatically breaking such connection while the manually adjustable means maintains its operative relation with the drum.

8. The combination with a hollow rotary drum, of a valve for controlling the supply of steam thereto, the valve having a stem mounted to rotate, and provided with a threaded portion, a nut which the threaded portion of the stem engages, the nut being journaled to prevent travel in the direction of the axis of the stem, means for preventing the stem when the valve is closed from rotating in a direction to turn on the steam, an operative connection between the nut and drum to impart a step-by-step rotary movement to the nut as the drum rotates, and means for automatically breaking such connection as the valve stem reaches the limit of its valve-opening movement.

9. The combination with a hollow rotary drum, of a valve for regulating the supply of steam or other fluid thereto, the valve being provided with a stem having a threaded portion, a nut which the threaded portion of the stem engages in coöperative relation, the nut being journaled to prevent travel longitudinally on the stem, a toothed wheel fast on the stem, a pawl mounted to engage the teeth of said wheel and lock the stem against rotation in the direction to open the valve when the latter is closed, and an operative connection between the drum and nut to rotate the latter in a direction to open the valve when the stem is so locked.

10. The combination with a hollow rotary drum, of a valve for regulating the supply of steam or other fluid thereto, the valve being provided with a stem having a threaded portion, a nut which the threaded portion of the stem engages in coöperative relation, the nut being journaled to prevent travel longitudinally on the stem, a toothed wheel fast on the stem, a pawl mounted to engage the teeth of said wheel and lock the stem against rotation in the direction to open the valve when the latter is closed, an operative connection between the drum and nut to rotate the latter in a direction to open the valve when the stem is so locked, said connection comprising a gear fast on the nut, a pinion meshing with said gear, a star wheel mounted to rotate with the pinion, and a part mounted to rotate with the drum and arranged to engage a tooth of the star wheel every time the drum makes a revolution.

11. The combination with a hollow rotary drum, of a valve for regulating the supply of steam or other fluid thereto, the valve being provided with a stem having a threaded portion, a nut which the threaded portion of the stem engages in coöperative relation, the nut being journaled to prevent travel longitudinally on the stem, a toothed wheel fast on the stem, a pawl mounted to engage the teeth of said wheel and lock the stem against rotation in the direction to open the valve when the latter is closed, an operative connection between the drum and nut to rotate the latter in a direction to open the valve when the stem is so locked, said connection comprising a gear fast on the nut, a pinion meshing with said gear, a star wheel mounted to rotate with the pinion, and a part mounted to rotate with the drum and arranged to engage a tooth of the star wheel every time the drum makes a revolution, the star wheel being adjustable to throw it into and out of operative relation with the said part carried by the drum, as occasion may require.

12. The combination with a hollow rotary drum, of a valve for regulating the supply of steam or other fluid thereto, the valve being provided with a stem having a threaded portion, a nut which the threaded portion of the stem engages in coöperative relation, the nut being journaled to prevent travel longitudinally on the stem, means for locking the stem against movement, a gear wheel fast on the nut, a pinion meshing with said gear, a spindle on which the pinion is mounted and with which it is connected to rotate, a star wheel mounted to rotate with the spindle, and a projection mounted to rotate with the drum and arranged to engage a tooth of the star wheel and impart a partial rotation thereto every time the drum makes a revolution.

13. The combination with a hollow rotary drum, of a valve for regulating the supply of steam or other fluid thereto, the valve being provided with a stem having a threaded portion, a nut which the threaded portion of the stem engages in coöperative relation, the nut being journaled to prevent travel longitudinally on the stem, means for locking the stem against movement, a gear wheel fast on the nut, a pinion meshing with said gear, a spindle on which the pinion is mounted and with which it is connected to rotate, a star wheel mounted to rotate with the spindle, a projection mounted to rotate with the drum and arranged to engage a tooth of the star wheel and impart a partial rotation thereto every time the drum makes a revolution, the cogged rim of the said gear having a removable segment normally spring-held in operative relation with the pinion, and means for automatically removing said segment as the valve stem approaches its valve-opening limit of movement.

14. The combination with a hollow rotary drum, of a valve for regulating the supply of steam or other fluid thereto, the valve being provided with a stem having a threaded portion, a nut which the threaded portion of the stem engages in coöperative relation, the nut being journaled to prevent travel longitudinally on the stem, means for locking the stem against movement, a gear wheel fast on the nut, a pinion meshing with said gear, a spindle on which the pinion is mounted and with which it is connected to rotate, a star wheel mounted to rotate with the spindle, a projection mounted to rotate with the drum and arranged to engage a tooth of the star wheel and impart a partial rotation thereto every time the drum makes a revolution, the cogged rim of the said gear having a removable segment, a leaf spring secured to the gear at one extremity and connected with the said segment at the opposite extremity, the said spring having an opening through which the valve stem passes, and means carried by the stem and acting on said spring for removing the segment from the rim of the gear as the valve stem reaches the limit of its opening movement.

15. The combination with a hollow rotary drum, of a valve for regulating the supply of steam or other fluid thereto, the valve being provided with a stem having a threaded portion, a nut which the threaded portion of the stem engages in coöperative relation, the nut being journaled to prevent travel longitudinally on the stem, a gear fast on the nut, a pinion meshing with the gear, a spindle with which the pinion is connected to rotate, a star wheel also connected to rotate with the spindle, a part mounted to rotate with the drum and arranged to momentarily engage a tooth of the star wheel during each rotation of the drum for imparting a step-by-step movement to the pinion and its coöperating parts, and means for frictionally retarding the movement of the pinion.

16. The combination with a hollow rotary drum, of a valve for regulating the supply of steam or other fluid thereto, the valve being provided with a stem having a threaded portion, a nut which the threaded portion of the stem engages in coöperative relation, the nut being journaled to prevent travel longitudinally on the stem, a gear fast on the nut, a pinion meshing with the gear, a spindle with which the pinion is connected to rotate, a star wheel also connected to rotate with the spindle, a part mounted to rotate with the drum and arranged to momentarily engage a tooth of the star wheel during each rotation of the drum for imparting a step-by-step movement to the pinion and its coöperating parts, means for frictionally retarding the movement of the pinion, said last named means comprising a loose washer mounted on the spindle adjacent the pinion, and a spring acting on said washer to force it against the pinion.

17. The combination with a hollow rotary drum, of a valve for regulating the supply of steam or other fluid thereto, the valve being provided with a stem having a threaded portion, a nut which the threaded portion of the stem engages in coöperative relation, the nut being journaled to prevent travel longitudinally on the stem, a toothed wheel fast on the stem, a pawl mounted to engage the teeth of said wheel and lock the stem against rotation in the direction to open the valve when the latter is closed, the pawl being fulcrumed intermediate its extremities, a stem having one end connected with the arm of the pawl on the opposite side of the fulcrum from the extremity which engages the toothed wheel, and a spring acting on said stem to hold the pawl yieldingly in engagement with the teeth of the said wheel.

18. The combination with a hollow rotary drum, of a valve for regulating the supply of steam or other fluid thereto, the valve being provided with a stem having a threaded portion, a nut which the threaded portion of the stem engages in coöperative relation, the nut being journaled to prevent travel longitudinally on the stem, a toothed wheel fast on the stem, and a spring actuated pawl mounted to engage the teeth of said wheel to lock the stem against rotation in the direction to open the valve, and a flexible diaphragm operably connected with the pawl on one side and with the steam pressure in the drum on the opposite side to automatically disconnect the pawl from the toothed face of the wheel when the drum is under normal steam pressure.

19. The combination with a hollow rotary drum, of a valve for regulating the supply of steam or other fluid thereto, the valve being provided with a stem having a threaded portion, a nut which the threaded portion of the stem engages in coöperative relation, the nut being journaled to prevent travel longitudinally on the stem, a wheel fast on the stem and having a series of recesses in its peripheral face, a spring actuated stop arranged to engage said recesses to lock the stem against rotary travel, an operative connection between the drum and the nut to rotate the latter in a direction to open the valve when the stem is so locked, and manually operable means for disconnecting the said stop from the said wheel.

20. The combination with a drum, of a valve for controlling the passage of steam to the drum, the valve being provided with a stem mounted to rotate, a wheel fast on the stem and having a series of recesses formed in its peripheral face, a spring actuated stop arranged to enter said recesses to lock the stem against rotation, the said stop having a stem provided with a projection, the valve stem having a threaded portion, a nut engaging the threaded portion of the valve stem and journaled to prevent travel longitudinally on the stem, a gear fast on said nut, a pinion meshing with said gear, a spindle with which said pinion is connected to rotate, a star wheel splined on the spindle, a projection mounted to rotate with the drum and adapted to momentarily engage a tooth of the star wheel during each revolution of the drum, the hub of the star wheel having one face provided with a cavity having an inclined wall, and means for shifting the star wheel out of the path of the projection on the drum and to cause the said inclined wall to engage the projection on the stem of the spring actuated stop, to disengage the latter from the wheel on the valve stem.

21. The combination with a rotary drum, of a valve for controlling the supply of steam to said drum, the said valve having a stem mounted to rotate and provided with a threaded portion, a nut engaging the threaded portion of the valve stem and journaled to prevent travel longitudinally on the stem, an operative connection between the nut and drum for imparting a step-by-step movement to the nut in synchronism with the rotations of the drum, a wheel fast on the valve stem and having a toothed side face and a recessed peripheral face, a spring-actuated pawl engaging the toothed face to lock the valve stem against travel in one direction when the valve is closed and for a limited period after the valve stem begins its travel in the direction to open the valve, and a spring actuated stop engaging the recesses in the said wheel for locking the stem against rotation after the wheel has been disconnected from the pawl due to the travel of the valve stem during the opening movement of the valve.

22. The combination with a rotary drum, of a valve for controlling the supply of steam to said drum, the said valve having a stem mounted to rotate and provided with a threaded portion, a nut engaging the threaded portion of the stem and journaled to prevent travel longitudinally on the stem, an operative connection between the nut and drum for imparting a step-by-step movement to the nut in synchronism with the rotations of the drum, a wheel fast on the valve stem and having a toothed face, a spring-actuated pawl engaging the toothed face of the wheel to lock the valve stem against travel in one direction, and an operative connection between the pawl and the steam pressure in the drum for automatically disconnecting the pawl from the toothed wheel when the drum is under normal steam pressure.

23. The combination with a rotary drum, of a valve for controlling the supply of steam to said drum, the said valve having a stem mounted to rotate and provided with a threaded portion, a nut engaging the threaded portion of the stem and journaled to prevent travel longitudinally on the stem, an operative connection between the nut and drum for imparting a step-by-step movement to the nut in synchronism with the rotations of the drum, a wheel fast on the valve stem and having a recessed peripheral face, a spring-actuated stop engaging the recesses in the said wheel for locking the stem against rotation, and means for manually disconnecting the said stop from the recessed face of the wheel.

24. The combination with a rotary drum, of a valve for controlling the supply of fluid thereto, said valve having a rotary stem, means for locking the stem against rotary movement in a direction to open the valve, a nut in which the valve stem is threaded, the nut being journaled to prevent travel in the direction of the axis of the stem, an operative connection between the nut and the drum, whereby as the latter is rotated the nut will be actuated to move the valve and its stem in the valve-opening direction, and frictional retarding means in the operative connection between the nut and the drum.

25. In valve mechanism for controlling the passage of fluid to rotary receptacles, the combination of a valve piece having a rotary stem provided with a threaded portion, a nut having threads coöperating with the threads of the said stem, the nut being journaled to prevent travel longitudinally of the stem, means for intermittently locking the stem against rotation in one direction, and an operative connection between the rotary receptacle and the nut for rotating the latter in the opposite direction.

26. In valve mechanism for controlling the passage of fluid, the combination of a valve piece having a rotary stem provided with a threaded portion, a nut having threads coöperating with the threads of the said stem, the nut being journaled to prevent longitudinal travel on the stem, and means for locking the stem against rotation in one direction.

27. In valve mechanism for controlling the passage of fluid, the combination of a valve piece having a rotary stem provided with a threaded portion, a nut having threads coöperating with the threads of said stem, the nut being journaled to prevent longitudinal travel on the stem, means for locking the stem against rotation in one direction, and means for rotating the nut in the opposite direction.

28. In valve mechanism the combination of a valve piece provided with a rotary stem having a threaded portion, a nut threaded to coöperate with the threaded portion of the stem, and journaled to prevent longitudinal travel on the stem, means to prevent rotation of the stem in one direction, and means for rotating the nut in the opposite direction to move the valve and its stem in the direction of the latter's axis.

29. The combination of a valve having a rotary stem, means for locking the stem against rotary movement in a direction to open the valve, a nut in which the valve stem is threaded, the nut being journaled to prevent its travel in the direction of the axis of the stem, and means for rotating the nut to move the valve and its stem in the valve opening direction.

30. In valve mechanism the combination of a valve for controlling the passage of steam, the valve having a stem mounted to rotate, and provided with a threaded portion, a nut which the threaded portion of the stem engages, the nut being journaled to prevent travel in the direction of the axis of the stem, and means for preventing the stem when the valve is closed from rotating in a direction to turn on the steam.

31. The combination of a valve for controlling the passage of fluid, the valve having a stem mounted to rotate and provided with a threaded portion, a nut which the threaded portion of the stem engages, the nut being journaled to prevent travel in the direction of the axis of the stem, means for preventing the stem when the valve is closed from rotating in a direction to turn on the fluid, and means for imparting a step by step rotary movement to the nut.

32. The combination of a valve for controlling the passage of fluid, the valve having a stem mounted to rotate and provided with a threaded portion, a nut which the threaded portion of the stem engages, the nut being journaled to prevent travel in the direction of the axis of the stem, means for preventing the stem when the valve is closed from rotating in a direction to turn on the fluid, means for imparting a step by step rotary movement to the nut, and means for automatically releasing the means for locking the valve stem against rotation.

33. In combination a valve provided with a stem having a threaded portion, a nut which the threaded portion of the stem engages, the nut being journaled to prevent longitudinal travel on the stem, a toothed wheel fast on the stem, a pawl mounted to engage the teeth of said wheel and lock the stem against rotation in the direction to open the valve when the latter is closed, the pawl being fulcrumed intermediate its extremities, a stem having one end connected with the arm of the pawl on the opposite side of the fulcrum from the extremity which engages the toothed wheel, and a spring acting on said stem to hold the pawl yieldingly in engagement with the teeth of the said wheel.

34. In combination a valve for regulating the passage of fluid, the valve being provided with a stem having a threaded portion, a nut which the threaded portion of the stem engages the nut being journaled to prevent longitudinal travel on the stem, a toothed wheel fast on the stem, a spring actuated pawl mounted to engage the teeth of said wheel to lock the stem against rotation in the direction to open the valve, and a flexible diaphragm operably connected with the pawl on one side and with the fluid pressure on the opposite side to automatically disconnect the pawl from the toothed face of the wheel when the fluid pressure is normal.

35. The combination of a valve for regulating the passage of fluid, the valve being provided with a stem having a threaded portion, a nut which the threaded portion of the stem engages the nut being journaled to prevent its travel longitudinally on the stem, a wheel fast on the stem and having a series of recesses in its peripheral face, a spring actuated stop arranged to engage said recesses to lock the stem against rotary travel, and means for disconnecting the said stop from said wheel.

36. The combination of a valve for regulating the passage of fluid, the valve being provided with a stem having a threaded portion, a nut which the threaded portion of the stem engages, the nut being journaled to prevent its travel longitudinally on the stem, a wheel fast on the stem and having a series of recesses in its peripheral face, a spring-actuated stop arranged to engage said recesses to lock the stem against rotary travel, and manually operable means for disconnecting the said stop from said wheel.

37. In combination, a valve for controlling the passage of fluid the said valve having a stem mounted to rotate and provided with a threaded portion, a nut engaging the threaded portion of the stem and journaled to prevent its travel longitudinally on the stem, a spring-actuated pawl engaging the toothed face of the wheel to lock the valve stem against travel in one direction, and an operative connection between the pawl and the fluid pressure for automatically disconnecting the pawl from the toothed wheel when the fluid pressure is normal.

38. In combination, a valve having a stem mounted to rotate and provided with a threaded portion, a nut engaging the threaded portion of the stem and journaled to prevent travel longitudinally on the stem, a wheel fast on the valve stem and having a recessed peripheral face, a spring actuated stop engaging the recesses in the said wheel for locking the stem against rotation, and means for manually disconnecting the said stop from the recessed face of the wheel.

39. In combination, a valve piece having a rotary stem provided with a threaded portion, a nut having threads coöperating with the threads of said stem, the nut being journaled to prevent longitudinal travel on the stem, and means for intermittently locking the stem against rotation in one direction.

40. The combination with a rotary receptacle, of a valve mounted independently of the receptacle for controlling the supply of fluid thereto, and an operative speed reducing connection between the valve and said receptacle for imparting movement to the valve.

41. The combination with a rotary receptacle of a valve mounted independently of the receptacle for controlling the supply of fluid thereto, and an operative speed reducing connection between the valve and said receptacle for imparting the opening movement to the valve.

42. The combination with a rotary receptacle, of a valve for controlling the supply of fluid thereto, and an operative speed reducing connection between the valve and said receptacle for imparting a step by step movement to the valve as the receptacle rotates.

43. The combination with a rotary receptacle, of a valve mounted independently of the receptacle for controlling the supply of fluid thereto, operating means arranged between the receptacle and the valve, and an operative speed reducing connection between the said means and the rotary receptacle to cause the latter during rotation to act upon the interposed means to impart movement to the valve.

44. The combination with a rotary receptacle, of a valve for controlling the supply of fluid thereto, speed reducing operating means for retarding the movement of the valve, and an operative connection between the rotary receptacle and the said operating means to cause the said receptacle to actuate said means to impart movement to the valve during the rotation of the receptacle.

45. The combination with a rotary receptacle, of a valve for controlling the passage of fluid thereto, speed reducing means arranged between the valve and the rotary receptacle to cause the receptacle to impart movement to the valve as the receptacle rotates, and means for automatically breaking the connection between the valve and the rotary receptacle.

46. In combination, a valve for controlling the passage of fluid to rotary receptacles, speed reducing means for opening said valve by the rotary movement of a receptacle of said character, means for retarding the opening movement of the valve, and means for manually closing said valve.

47. In combination, a rotary receptacle, a valve for controlling the passage of fluid thereto, means for manually operating the valve, and a speed reducing connection between said last named means and the rotary receptacle to operate the valve as the receptacle rotates.

48. In combination, a rotary receptacle, a valve for controlling the passage of fluid thereto, means for manually operating the valve and speed reducing means for operating it also through the medium of the said receptacle as the latter rotates.

49. In combination, a rotary receptacle, a valve for controlling the passage of fluid thereto, means for manually operating the valve, and an operative speed reducing connection between the said valve and the rotary receptacle.

50. In combination, a rotary receptacle, a valve for controlling the passage of fluid thereto, means for manually operating the valve, means for locking said operating means against movement to open the valve, and means actuated by the fluid pressure in the receptacle for releasing said locking means.

51. In combination, a rotary receptacle, a valve for controlling the passage of fluid thereto, means for manually operating the valve, means for locking said operating means to prevent the opening movement of the valve, and means, including a flexible diaphragm acted on by the fluid pressure in the receptacle for releasing said locking device.

52. In combination, a rotary receptacle, a valve for controlling the passage of fluid to the receptacle, means for manually operating the valve, means for locking said operating means to prevent the opening movement of the valve, a connection between the valve and rotary receptacle to operate the valve as the receptacle rotates, and means actuated by the fluid pressure in the receptacle to release the said locking means.

53. In combination, a rotary receptacle, a valve for controlling the passage of fluid to the receptacle, means for manually operating the valve, means for locking said operating means to prevent the opening movement of the valve, a connection between the valve and the rotary receptacle to operate the valve as the receptacle rotates, and means, including a diaphragm, acted on by a predetermined fluid pressure in the receptacle for releasing said locking means.

54. Valve mechanism for controlling the passage of fluid pressure to rotary receptacles, comprising a valve, means to open the same by the rotary movement of said receptacle, and means to open and close said valve manually, the manually operating means being normally locked to prevent opening movement.

55. Valve mechanism for controlling the passage of fluid pressure to rotary receptacles comprising a valve, means to open the same by rotary movement of said receptacle, means to open and close said valve manually, said last named means being normally locked to prevent opening movement of the valve, and means responsive to the fluid pressure passed through the said valve to release said locking device.

56. In valve mechanism for controlling the passage of fluid, the combination of a valve piece having a rotary stem provided with a threaded portion, a nut having threads coöperating with the threads of said stem, the nut being mounted to prevent longitudinal travel on the stem, means for locking the stem against rotation in one direction, and fluid pressure controlled means for releasing the locking means.

In testimony whereof I affix my signature, in presence of two witnesses.

MARTIN H. COLLOM.

Witnesses:
GRACE HUSTON,
A. J. O'BRIEN.

Copies of this patent may be obtained for five cents each, by addressing the "Commissioner of Patents. Washington, D. C."